Patented Dec. 18, 1945

2,391,194

UNITED STATES PATENT OFFICE 2,391,194

RECTIFIERS

David Rau, Kirkwood, and Carl E. Peters, Clayton, Mo., assignors to B. L. Electric Company, St. Louis, Mo., a corporation of Missouri No Drawing. Application July 29, 1942, Serial No. 452,804

9 Claims. (Cl. 175—366)

This invention relates to improvements in rectifiers. More particularly the invention relates to improvements in methods of making rectifiers.

It is an object of the present invention to provide an improved method of making rectifiers.

To be really satisfactory, a dry disc rectifier should offer a high resistance to the flow of current in one direction and should offer a low resistance to the flow of current in the opposite direction. This is necessary so the rectifier may efficiently change alternating current into direct current. Some materials, that are known to those skilled in the art as semi-conductors, inherently possess the ability to resist current flow in one direction while they permit relatively unimpeded current flow in the other direction. These materials are said to possess current rectification properties, and where an electrode is placed in contact with one surface of a material of this kind, a rectifier is formed. If alternating current is impressed on such a rectifier, the rectifier will change the alternating to direct current. These semi-conductors all possess current rectification properties in different degrees; some of them have very good inherent current rectification properties and others do not. The inherent current rectification properties of some of these materials can be improved by treating the materials in accordance with the principles of the invention. It is, therefore, an object of the present invention to provide a method of improving the current rectification properties inherent in some semi-conductors.

In rectifiers that have a semi-conductor as an integral part thereof, the current rectification occurs at, or in the neighborhood of, one of the surfaces of the semi-conductor. This surface is the surface in contact with the electrode that is associated with the semi-conductor. The invention provides a method of improving rectification properties of this surface, and of the rectifier itself, that includes the provision of a coating of material on this surface. It is, therefore, an object of the present invention to improve the current rectification properties of a semi-conductor by coating one surface thereof.

One of the semi-conducting materials that is commercially acceptable for use in rectifiers is selenium, and this material inherently possesses fairly good rectification properties. Selenium will transmit current relatively freely in the conducting direction, but will offer considerable resistance to the flow of current in the reverse direction. Rectifiers made from selenium will give fairly satisfactory performance, but it is possible by use of the present invention to materially increase the efficiency of selenium rectifiers. It is, therefore, an object of the present invention to provide a more efficient selenium rectifier.

The invention attains greater efficiency in selenium rectifiers by providing a film or layer on the surface of the selenium. This layer is then covered by an electrode, and thereby permanently sealed between the selenium and the electrode. This film or layer increases the resistance to current flow in the reverse direction without materially decreasing the flow of current in the conducting direction, and thereby increases the efficiency of the rectifier. It is, therefore, an object of the invention to provide a film or layer of material between the selenium and the electrode in contact therewith, that increases the resistance to the flow of current in the reverse direction without appreciably increasing the resistance to the flow of current in the conducting direction.

Other objects and advantages of the invention will become apparent to those skilled in the art from an examination of this description.

For the sake of brevity and clarity, this description is limited to an explanation of how the invention may be used in improving the current rectification properties of selenium, but it is to be understood that the invention is not limited to this particular method or to selenium rectifiers, and the invention will be defined by the appended claims.

In improving the current rectification properties of selenium, the invention forms a film or layer on the surface of the selenium after the selenium has been converted from the vitreous to the desired crystalline or metallic state. Selenium is usually supported on a base plate and is usually applied to the base plate with heat. As a result of this heating, the vitreous selenium is attached to the plate. Before it can have the desired current rectification properties, the selenium must be converted to the crystalline or metallic state by heat or by heat and pressure. After this has been done, the selenium may be immersed in a sodium aluminate bath that will provide the desired coating.

The electrical characteristics of the selenium plate will depend upon the length of time the selenium plate is immersed in the bath, upon the strength and composition of the bath, and upon the temperature of the bath. The strength and composition of the bath and the length of time the selenium plate must be immersed in the bath are interdependent factors, and therefore a strong bath requires a lesser time than a weak bath would require. The temperature of the bath also is a factor in determining the time of immersion.

Certain grades of commercial sodium aluminate solutions may be used but it is possible to make up sodium aluminate solutions that are better for this work than the commercial solutions would be. A very practical and commercial bath, but by no means the only bath that can be used, is obtained by dissolving 20 grams of sodium hydroxide in 100 cc. of water, and then adding 20 grams of aluminum hydroxide and 10 grams of Rochelle salts. This bath is particularly desirable because it will ordinarily remain in solution, but will readily form a precipitate on the surface of a layer of selenium immersed in it. The Rochelle salts do not have any particular utility other than to stabilize the solution to prevent precipitation of aluminum hydroxide. Sodium aluminate is a relatively unstable compound that tends to form a precipitate. Such precipitation is desirable at the proper time because it gives the desired layer on the surface of the selenium plate, but such precipitation in the absence of the selenium is not desirable. Precipitation in the absence of selenium would mean that the supply of sodium aluminate would have to be renewed quite often. This would slow down the manufacturing process involved and would also increase its cost. We have found that by making the bath strongly alkaline, we can eliminate most of the precipitation that would occur in the absence of the selenium without retarding precipitation in the presence of the selenium. Furthermore, we have found that the addition of Rochelle salts will materially assist in maintaining the sodium aluminate in solution until the selenium is immersed therein. This is very important because it adapts this method to production line work and permits uniformity and standardization of the product.

When the selenium is immersed in the heated bath, a precipitate forms on its surface. This precipitate possibly contains sodium aluminate, probably the hydroxides of aluminum and some aluminum oxide. This precipitation probably results from a reduction of the alkalinity in the neighborhood of the selenium due to the attacking of the selenium by the alkaline components of the bath. We probably have a temporary reduction of the alkalinity in the area immediately adjacent the surface of the selenium, and this reduction in alkalinity permits the formation of the precipitate. If the selenium were removed from the bath and washed, the precipitate could be removed to a great extent, and it is, therefore, desirable to place the selenium in a hot rinsing bath of water. This rinsing bath "sets" the precipitate and also halts the chemical action started in the original bath. After the selenium plate has been rinsed it is dried and is ready to receive the electrode that is to be placed in contact therewith.

The provision of this precipitate is quite useful as the following table clearly shows. In making this test three untreated selenium plates were compared with three treated selenium plates. The treated plates showed a slight increase in voltage in the forward direction of current but showed a disproportionately greater increase in the inverse direction of current flow. This enables the selenium plate to operate much more efficiently as a rectifier.

|  | Voltage at— | |
|---|---|---|
|  | Forward direction +.080 amp. | Inverted direction −.008 amp. |
| Untreated plates: |  |  |
| No. 1 | 0.60 | 5.2 |
| No. 2 | 0.60 | 5.3 |
| No. 3 | 0.62 | 6.0 |
| Treated plates: |  |  |
| No. 4 | 0.78 | 15.0 |
| No. 5 | 0.79 | 17.0 |
| No. 6 | 0.79 | 17.0 |

Whereas the description has described a preferred manifestation of the invention, it is obvious to those skilled in the art that various changes may be made in the manifestation of the invention without affecting the scope of the invention.

What we claim is:

1. The method of improving the current rectification properties of the selenium in selenium rectifiers that comprises the forming of a layer of sodium aluminate and sodium and aluminum hydroxides on one surface of the selenium.

2. The method of forming a layer on a selenium electrode that comprises the immersing of the selenium electrode in a heated bath of sodium hydroxide, aluminum hydroxide and Rochelle salts.

3. The method of forming a layer on a selenium surface that comprises the immersing of the selenium in a bath of sodium hydroxide and aluminum hydroxide.

4. An improved selenium rectifier comprising a selenium surface, an electrode, and a layer of sodium aluminate disposed therebetween that is in direct contact with said selenium surface.

5. A method of making an improved selenium rectifier comprising the immersing of the metallic selenium coated base plate in a solution of sodium aluminate that is maintained at a temperature below or at the boiling point.

6. The method of producing an improved selenium rectifier comprising the immersing of the selenium coated base plate in a solution of sodium aluminate which is maintained at a temperature slightly below its boiling point, rinsing the selenium in hot water and placing an electrode in contact with the selenium surface.

7. The method of forming a layer on a selenium electrode that comprises the immersing of the selenium electrode in a heated bath of sodium aluminate and Rochelle salts.

8. The method of forming a layer on a selenium electrode that comprises the immersing of the selenium electrode in a bath of sodium aluminate.

9. The method of improving the current rectification properties of a semi-conductor, that comprises the immersing of the semi-conductor in a bath of a soluble aluminate of predetermined strength for a predetermined length of time.

CARL E. PETERS.
DAVID RAU.